(12) United States Patent
Franke

(10) Patent No.: US 6,267,712 B1
(45) Date of Patent: Jul. 31, 2001

(54) PRESSURE ROLLER FOR TEXTILE MACHINES

(75) Inventor: Günter Franke, Oberreichenbach (DE)

(73) Assignee: INA Walzlager Schaeffler oHG (DE)

( * ) Notice: Subject to any disclaimer, the term of this patent is extended or adjusted under 35 U.S.C. 154(b) by 0 days.

(21) Appl. No.: 09/381,722

(22) PCT Filed: Nov. 6, 1997

(86) PCT No.: PCT/EP97/06170

§ 371 Date: Dec. 27, 1999

§ 102(e) Date: Dec. 27, 1999

(87) PCT Pub. No.: WO98/42991

PCT Pub. Date: Oct. 1, 1998

(30) Foreign Application Priority Data

Mar. 25, 1997 (DE) .............................. 197 12 417

(51) Int. Cl.[7] ...................................... F16C 13/00
(52) U.S. Cl. .............................................. 492/16
(58) Field of Search .................. 492/16, 60; 29/895, 29/895.2, 898.07, 898.062

(56) References Cited

FOREIGN PATENT DOCUMENTS

| 284359 | 7/1952 | (DE) . |
|---|---|---|
| 1 699 090 | 5/1955 | (DE) . |
| DE 28 05 923 A1 | 8/1979 | (DE) . |
| DE 29 23 871 A1 | 12/1980 | (DE) . |
| DE 36 12 066 A1 | 10/1987 | (DE) . |
| DE 37 11 406 A1 | 10/1988 | (DE) . |
| DE 44 20 669 | 12/1995 | (DE) . |
| 2 137 299 | 12/1972 | (FR) . |

OTHER PUBLICATIONS

International Search Report from International Application PCT/EP97/06170 dated Apr. 15,1998.
Office Action dated Aug. 6, 1997 from related German Application 197 12 417.8.

Primary Examiner—S. Thomas Hughes
Assistant Examiner—M. Butler
(74) Attorney, Agent, or Firm—Volpe & Koenig, PC

(57) ABSTRACT

A pressure roller for textile machines, in particular for a texturing machine, is provided. A covering (3) is preferably arranged over an intermediate sheath (4) on a support sheath (5). The support sheath (5) is rotatably supported via a deep groove ball bearing (1) on a carrying axle (2). For cost-effective manufacturing of a pressure roller, a standardized deep groove ball bearing (1) that has at least an outer bearing race (6, 7) and balls (9) that roll on the ball grooves (10, 11) of the bearing race (6, 7) is proposed; the outer bearing race (6) of which carries the support sheath. The structural height of the standardized deep groove ball bearing amounts to at maximum 80 percent of the axial extension of the support sheath (5).

3 Claims, 1 Drawing Sheet

PRESSURE ROLLER FOR TEXTILE MACHINES

BACKGROUND OF THE INVENTION

The present invention is directed to a pressure roller for textile machines, as are used, for example, for a texturing machine for pressing a filament against a delivery roller.

From German Patent DE-A 29 23 871, a pressure roller is known, the covering of which is formed from plastic or rubber and is arranged, for example, on a support sheath which at the same time forms the outer bearing race of a deep groove ball bearing, by which the pressure roller can be turned on a carrying axle. The outer races of the deep groove ball bearings used require a costly processing; the ball grooves are worked into the outer bearing races and moreover, on the axial ends of the outer bearing races, cylindrical shoulders are provided on the inside, which are provided to receive a grinding arbor. In order to grind the coating of the pressure roller in a flawless manner and with a high degree of precision in running, the pressure roller is clamped onto the grinding arbor.

Embodiments are also known, in which between the support sheath already mentioned above and the covering, an intermediate sheath is provided, made of aluminum, for example. In this case, the covering and the intermediate sheath form a prefabricated component that is pressed onto the outer bearing race of the deep groove ball bearing, for example. It is advantageous in this pressure roller that a prefabricated unit can be made which on the one hand, is formed from the intermediate sheath provided with the coating and on the other hand, is made from the complete deep groove ball bearing, the outer bearing race of which is constructed simultaneously as a support sheath. The covering must no longer be applied in a costly process, for example, by spraying onto the outer bearing race, but instead the prefabricated units are merely pressed together.

In both of the embodiment examples described, however, the expensive processing of the outer bearing race of the deep groove ball bearing is disadvantageous. In both cases, the ball grooves and the cylindrical shoulders arranged to the side must be provided for receiving the grinding arbor. Pressure rollers for textile machines are mass-production articles, in the manufacturing of which cost-effective solutions are desired.

SUMMARY OF THE INVENTION

It is thus the purpose of the invention to further develop a pressure roller for textile machines, and in particular for a texturing machine, in such a way that the manufacturing of the deep groove ball bearing is simplified and thus the manufacturing costs for the pressure roller are clearly reduced.

According to the invention, this purpose is achieved in that a standardized deep-groove ball bearing that has a bearing race and balls that roll on the bearing race is provided, the outer bearing race of which carries the support sheath, where the structural height of the standardized deep groove ball bearing is at most 80 percent of the axial extension of the support sheath. In the pressure roller according to the invention, for example, a simple smooth cylindrical support sheath made of steel can be used, which is provided with the covering on the outside. The standardized deep groove ball bearing can be introduced in a simple way into the support sheath and attached to it for example, by interference fit or adhesive. The standardized deep groove ball bearings are considerably more cost-effective than the known, expensive to produce deep-groove ball bearings having specially constructed outer bearing races. By the specification of the maximum structural height of the standardized deep-groove ball bearing in terms of the axial extension of the support sheath it is ensured that on both sides of the deep groove ball bearing, sufficient space is provided on the support sheath for grinding arbors. In a pressure roller according to the invention that is fitted to the requirements of applied practice, the structural height of the standardized standard deep groove ball bearing amounts to approximately 30% of the axial extension of the support sheath.

In the pressure roller according to the invention it is possible that the support sheath and the standardized deep groove ball bearing are pulled into the intermediate sheath formed out of aluminum, for example, that carries the covering. It is also conceivable, however, that the support sheath is provided directly with the coating and then pulled onto the outer bearing race of the standardized deep groove ball bearing.

The support sheath is preferably provided with an inwardly projecting central section for receiving the outer bearing race. When the standardized deep groove ball bearing is arranged in the area of the central section, material displacements, preferably embossings, can be provided on one or even on both sides of the central section, in order to affix the standardized deep groove ball bearing relative to the support sheath. Due to the way in which the central section projects radially inwardly, an introduction and application of suitable tools for the material displacement is possible without problem.

A pressure roller that is especially light in weight has a support sheath, in which the side sections adjacent to the central section have a wall thickness that is larger than 2.0% and smaller than 6.0% of the outer diameter of the support sheath.

For application in texturing machines, the pressure roller according to the invention is arranged so that it can pivot transversely to the support axle via a pendulum device. The pendulum device has a pendulum sheath arranged concentrically to the support axle and a pin, which is guided through transverse drill holes of the support axle and the pendulum sheath. The pendulum sheath can, for example, be manufactured out of plastic by injection molding, where it is conceivable to mold the pendulum sheath onto the inner bearing race of the standardized deep groove ball bearing.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

DETAIL DESCRIPTION OF THE INVENTION

Figure 1:
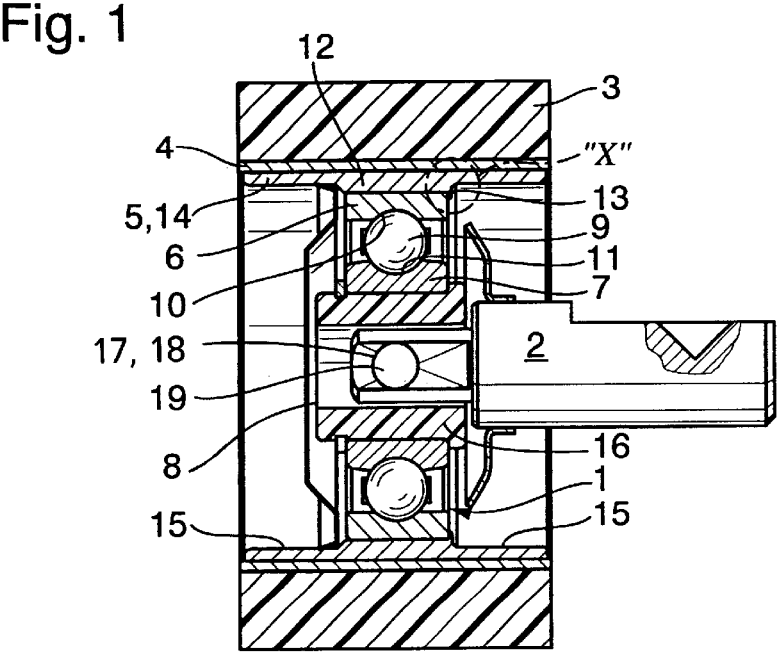
FIG. 1 is a lengthwise section through a pressure roller according to the invention.

FIG. 1 shows in longitudinal section a pressure roller according to the invention for textile machines, in particular, for a texturing machine for pressing a filament, not shown, against a delivery roller, also not shown. The pressure roller is set in bearings so that it can rotate over a standardized deep groove ball bearing 1 relative to a support axle 2. A coating 3 formed from rubber or plastic surrounds an intermediate sheath 4 formed from aluminum, which is carried by a support ring 5. The support ring 5 is pulled onto the outer bearing race 6 of the standardized deep groove ball bearing 1. The structural height (i.e., the axial dimension) of the standardized deep groove ball bearing 1 is set at a maximum of 80% of an axial length or extension of the support ring or sheath 5. In the preferred embodiment, the structural height of the standardized deep groove ball bearing 1 is approximately 30% of the axial extension of the support sheath 5. The standardized deep groove ball bearing is arranged so that it can tilt via a pendulum device 8 relative to the carrying axle 2 transversely to the longitudinal axle. Between the two bearing races 6 and 7, balls 9 are arranged, which roll on the ball grooves 10, 11 of the bearing races 6, 7. The support sheath 5 preferably made out of steel has a central section 12 projecting to the inside for receiving the outer bearing race 6, where embossings 13 provided on both sides of the central section 12 engage behind the outer bearing race on the side face.

Side sections 14 adjacent to the central section are designed to be thin-walled and are provided with cylindrical shoulders 15 on the inside for receiving grinding arbors, not shown. The side sections 14 have wall thicknesses that are larger than 2.0 percent and smaller than 6.0 percent of the outer diameter of the support sheath 5.

Figure 2:
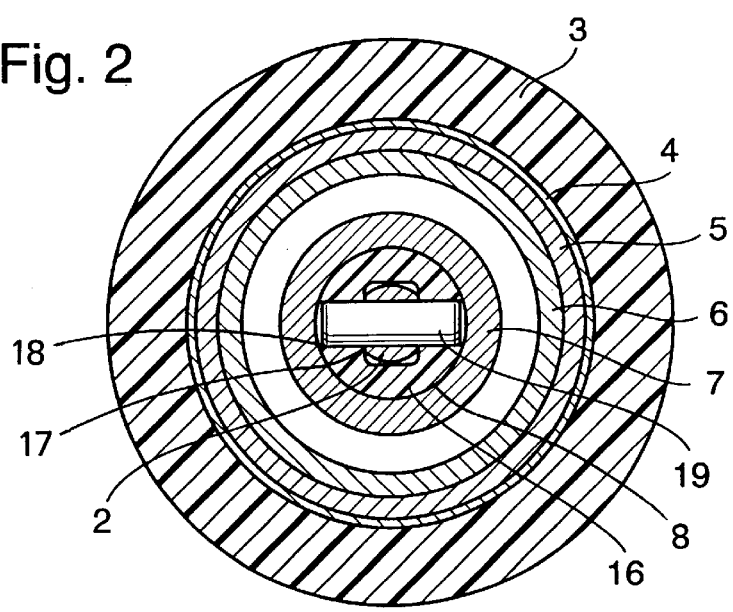
FIG. 2 is a cross-section through the pressure roller according to the invention according to FIG. 1.

The pendulum device 8 has a pendulum sheath 16 constructed out of plastic, which is arranged concentrically to the support axle 2, and which is attached to the inner bearing race 7. The pendulum device 8 is clearly shown in FIG. 2. The carrying axle 2 and the pendulum sheath 16 are provided with transverse holes 17, 18, through which a pin 19 is inserted. Since play is provided crosswise to the pins 19 on both sides between the carrying axle 2 and the pendulum sheath 16, it is ensured that the pressure roller can swing around the longitudinal axis of the pin 19.

Figure 3:
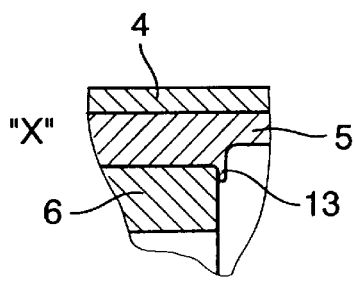
FIG. 3 is a detail of a portion of the pressure roller according to FIG. 1 at the area designated "X" which has been enlarged.

FIG. 3 shows the embossings 13 mentioned above which are constructed on several positions of the support sheath 5, arranged distributed over the circumference.

What is claimed is:

1. Pressure roller for textile machines comprising a covering which is made of plastic or rubber and is arranged over an intermediate sheath on a support sheath, wherein the support sheath is rotatably supported via a deep groove ball bearing on a carrying axle, said ball bearing is a standardized deep groove ball bearing that has at least an outer bearing race and balls that roll on a ball groove of the outer bearing race, the outer bearing race arranged to carry the support sheath, the support sheath having an inwardly projecting central section which receives the outer bearing race and is provided with material displacements on at least one side of said central section which are engaged behind the outer bearing race on a side face, and a structural height of the standardized deep groove ball bearing is set at a maximum of 80 percent of an axial extension of the support sheath.

2. Pressure roller according to claim 1, wherein the support sheath includes side sections adjacent to the central section which have wall thicknesses that are larger than 2.0 percent and smaller than 6.0 percent of an outer diameter of the support sheath.

3. Pressure roller according to claim 1, further comprising a pendulum device for pivotal movement of the pressure roller transversely to the carrying axle, the pendulum device including a pendulum sheath arranged concentrically to the carrying axle and a pin, which is located in transverse holes in the carrying axle and the pendulum sheath.

* * * * *